C. L. TUCKER.
IRON AND BRACE.
APPLICATION FILED APR. 8, 1913.
1,083,779.
Patented Jan. 6, 1914.
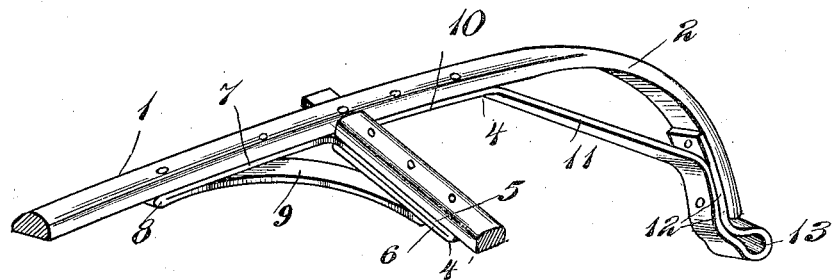
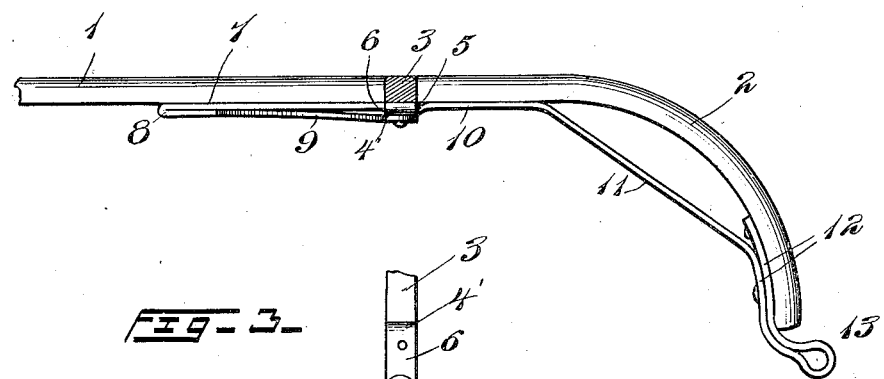
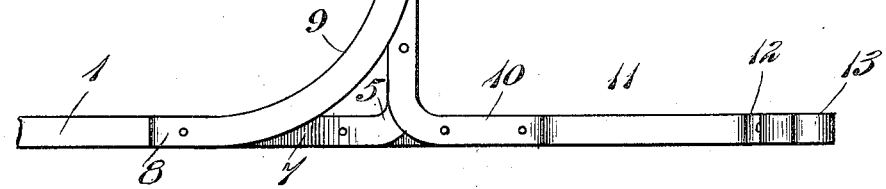
Inventor
C. L. Tucker
Witnesses
R. F. Maryman
J. W. Garner
By Victor J. Evans
Attorney

UNITED STATES PATENT OFFICE.

CLARENCE L. TUCKER, OF JEFFERSON CITY, TENNESSEE.

IRON AND BRACE.

1,083,779.

Specification of Letters Patent.

Patented Jan. 6, 1914.

Application filed April 8, 1913. Serial No. 759,714.

*To all whom it may concern:*

Be it known that I, CLARENCE L. TUCKER, a citizen of the United States, residing at Jefferson City, in the county of Jefferson and State of Tennessee, have invented new and useful Improvements in Irons and Braces, of which the following is a specification.

This invention is an improved combined thill iron and brace adapted for use on the shafts of buggies and other vehicles, to strengthen the shafts, to form coupling members therefor and to also strengthen and brace the connection between the shafts and the cross bar, the invention consisting in the construction and arrangement of parts hereinafter described and claimed.

In the accompanying drawing:—Figure 1 is a perspective view of the rear portion of a shaft or thill and of a portion of the cross bar and showing the same provided with one of my improved irons and braces. Fig. 2 is a side elevation of the same with the cross bar indicated in section. Fig. 3 is an inverted plan of the same.

For the purpose of this specification, I show the rear portion of a thill or shaft at 1, with its curved rear end 2 and the usual cross bar 3. In accordance with my invention, I provide a combined thill iron and brace 4 which is made of a single piece or bar of metal preferably buggy tire steel. The bar is doubled at an intermediate point to form an arm 4 which comprises an upper ply or member 5 and a lower ply or member 6, the said arm being adapted to be arranged under and to be bolted to that portion of the cross bar 3 which is jointed to the shaft or thill. The bar is bent forwardly as at 7 to bear under the thill immediately in front of the cross bar and is doubled and bent rearwardly as at 8 and curved to form a brace 9, the end of which bears under the lower ply 6 of the arm 4 and is secured thereto by one of the bolts which secures the arm 4 to the cross bar. Hence, the front portion of the forwardly extending arm 7 is doubled and the brace 9 is formed integral therewith. The bar is also bent rearwardly, from the lower ply 5 of the arm 4 as at 10, to bear under the thill at a point in rear of the cross bar and to be bolted to the thill, is then bent downwardly and rearwardly to form an inclined brace 11 and its rear end is doubled as at 12 and adapted to be bolted on the front side of the lower end of the thill and is formed in its bight 13 with an opening for the reception of the coupling bolt which connects the thill to the front axle. Hence, my improved brace not only serves to brace and reinforce the thill and cross bar and the connection between them but also forms an attaching member for the thill.

The entire combined brace and thill iron is made from a single piece of metal, is exceedingly strong and durable, may be very readily manufactured at small cost and may be readily attached to and removed from a thill and its cross bar.

Any suitable coupling may be secured to my improved thill iron and brace by riveting or welding the same thereto.

I claim:—

The herein described combined thill iron and brace comprising a bar having portions to lie against the under side of a thill in front and rear of the cross bar, an inwardly extending doubled arm integral with the bar for arrangement under the cross bar of the thill and a brace arm extending rearwardly from the front end of the bar and connected at its end to the said inwardly extending arm, a downwardly inclined rear portion for arrangement under the bend of the thill, and a doubled rear terminal portion to be bolted to the front side of the lower end of the bend of the thill and having a bight forming an eye for the reception of a coupling bolt.

In testimony whereof I affix my signature in presence of two witnesses.

CLARENCE L. TUCKER.

Witnesses:
FRANK PARK, Jr.,
THOMAS R. HARRISON.

Copies of this patent may be obtained for five cents each, by addressing the "Commissioner of Patents, Washington, D. C."